US008340267B2

(12) United States Patent
Florencio et al.

(10) Patent No.: US 8,340,267 B2
(45) Date of Patent: Dec. 25, 2012

(54) AUDIO TRANSFORMS IN CONNECTION WITH MULTIPARTY COMMUNICATION

(75) Inventors: Dinei A. Florencio, Redmond, WA (US); Alejandro Acero, Bellevue, WA (US); William Buxton, Ontario (CA); Phillip A. Chou, Bellevue, WA (US); Ross G. Cutler, Redmond, WA (US); Jason Garms, Issaquah, WA (US); Christian Huitema, Clyde Hill, WA (US); Kori M. Quinn, Redmond, WA (US); Daniel Allen Rosenfeld, Seattle, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 964 days.

(21) Appl. No.: 12/365,949

(22) Filed: Feb. 5, 2009

(65) Prior Publication Data

US 2010/0195812 A1    Aug. 5, 2010

(51) Int. Cl.
*H04M 3/42* (2006.01)

(52) U.S. Cl. .................. 379/202.01; 370/261; 709/204; 709/227

(58) Field of Classification Search ............. 379/202.01; 370/261; 709/204, 227
See application file for complete search history.

(56) References Cited

U.S. PATENT DOCUMENTS

| | | | |
|---|---|---|---|
| 4,734,934 A | 3/1988 | Boggs et al. | |
| 4,817,149 A | 3/1989 | Myers | |
| 5,913,192 A | 6/1999 | Parthasarathy et al. | |
| 6,125,115 A | 9/2000 | Smits | |
| 6,178,237 B1 | 1/2001 | Horn | |
| 6,882,971 B2 | 4/2005 | Craner | |
| 7,305,078 B2 | 12/2007 | Kardos | |
| 2003/0051136 A1* | 3/2003 | Curtis et al. | 713/163 |
| 2004/0008249 A1 | 1/2004 | Nelson et al. | |
| 2004/0235545 A1 | 11/2004 | Landis | |
| 2006/0285671 A1 | 12/2006 | Tiruthani et al. | |
| 2007/0233472 A1* | 10/2007 | Sinder et al. | 704/219 |

OTHER PUBLICATIONS

Seligmann, et al. Providing Assurances in a Multimedia Interactive Environment http://www.sigchi.org/chi95/proceedings/papers/dds_bdy.htm. Last accessed Nov. 25, 2008, 9 pages.

* cited by examiner

*Primary Examiner* — Quynh Nguyen
(74) *Attorney, Agent, or Firm* — Lee & Hayes, PLLC

(57) ABSTRACT

The claimed subject matter relates to an architecture that can preprocess audio portions of communications in order to enrich multiparty communication sessions or environments. In particular, the architecture can provide both a public channel for public communications that are received by substantially all connected parties and can further provide a private channel for private communications that are received by a selected subset of all connected parties. Most particularly, the architecture can apply an audio transform to communications that occur during the multiparty communication session based upon a target audience of the communication. By way of illustration, the architecture can apply a whisper transform to private communications, an emotion transform based upon relationships, an ambience or spatial transform based upon physical locations, or a pace transform based upon lack of presence.

18 Claims, 11 Drawing Sheets

AUDIO TRANSFORMS IN CONNECTION WITH MULTIPARTY COMMUNICATION

BACKGROUND

In recent years, advances in telecommunications have lead to a dramatic rise in multiparty chats, teleconferences, videoconferencing, and even telepresence settings, in which live exchanges of information can be effectuated by remote participants to a multiparty communication sessions. To meet the ever increasing demands of the market place, multiparty communication sessions should meet or exceed the beneficial features afforded by face-to-face communications, yet, in many instances, conventional multiparty communication sessions fall short in this regard, especially with regard to subtle or overlooked cues individuals typically rely upon for various forms of identification or information.

For example, in a live, in-person communication setting, one participant might discreetly lean close to a second participant to make a private remark. Unfortunately, many multiparty communication sessions do not provide the ability to make private remarks to one or a small subset of participants. Rather, any communicative inputs are received by substantially all parties to the communication session. Moreover, in the above example, the in-person private aside is accompanied by a number of visual and audio cues to indicate the forthcoming information is intended to be private that do not exist in associated multiparty communications with remote participants. Specifically, a remote participant who receives a private aside would not traditionally have the benefit of observing the visual or auditory indicia that accompany a private aside (e.g., leaning close to one's ear, discretely passing a document, speaking in a subdued tone or a whisper . . . ).

More broadly, there are a number of visual or auditory cues that occur during an in-person meeting that are not adequately emulated or simulated today by conventional multiparty communication session systems or services.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can preprocess audio portions of communications in order to enrich multiparty communication environments with remote participants. In accordance therewith and to other related ends, the architecture can host a multiparty communication session in which at least one party is a remote party. Likewise, the architecture can join an existing multiparty communication session. Regardless, both a public channel that propagates public communication received by substantially all participants and a private channel that propagates private communication to a select subset of all participants can be provided to an associated user device. Thus, public communications can be sent or received by way of the public channel, whereas private communications can be sent or received by way of the private channel. In either case, received communications can be presented on a local device, e.g. local to an associated user.

In addition, the architecture can apply an audio transform to an audio portion of communications that are propagated by way of the multiparty communication session. Appreciably, the audio transform can be applied to either public communications or private communications, and can further by applied to one or both outgoing communications or incoming communications. In general, the audio transform can be applied based upon a target audience of the communication, and will typically enrich the multiparty communication session, often by providing an audio cue or metaphor representative of in-person communication that is lacking from conventional telecommunication systems or services.

By way of illustration, the architecture can apply a whisper transform to private communications in order to, e.g., indicate the communication is not public; an emotion transform based upon relationships in order to, e.g. suppress undesired or inappropriate emotions or behaviors; an ambience or spatial transform based upon physical locations in order to, e.g. simulate remote presence or cues relating to identity; or a pace transform based upon lack of presence in order to, e.g., allow rapid review of missed material without an awkward or unnatural sensation.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
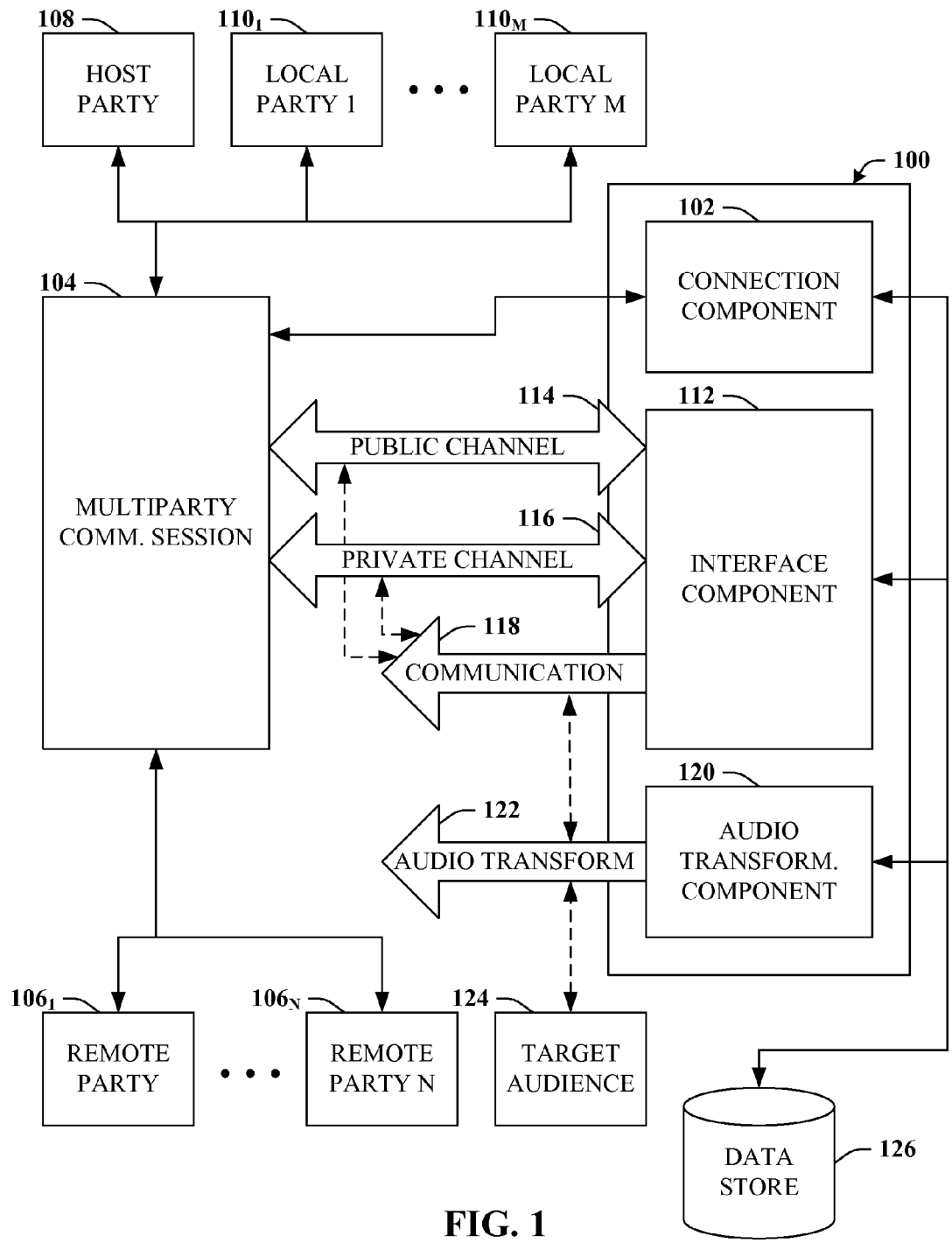
FIG. 1 illustrates a block diagram of a computer-implemented system that can preprocess audio portions of communication to enrich multiparty communication environments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can preprocess audio portions of communication to enrich multiparty communication environments is depicted. Generally, system 100 can include connection component 102 that can host or join multiparty communication session 104 in which one or more party to multiparty communication session 104 is remote party $106_1$-$106_N$ (referred to herein either collectively or individually as remote party 106), where N is any integer greater than 1. Multiparty communication session 104 can be hosted by host party 108, and can also be accessed by substantially any number of local parties $110_1$-$110_M$, where M is an integer greater than 1. As used herein, the term "party" is intended to serve as a proxy for a user or agent of the claimed subject matter, and thus typically refers specifically to a device or application associated with a given user or agent. Accordingly, it is often convenient to refer to a party (e.g., party 106, 108, or 110) in the context of an individual user to provide readily understood examples. However, it should be appreciated that such references generally invoke or refer to the associated device or application as well.

Thus, all or portions of the claimed subject matter (e.g., system 100, etc.) can be individually included in devices or applications associated with substantially any or all parties 106-110 described herein. Hence, when operating or existing in host party 108, connection component 102 can host multiparty communication session 104, whereas in remote party 106 or local party 110, connection component 102 can join multiparty communication session 104. By way of example, multiparty communication session 104 can be a teleconference, a chat channel, or the like, wherein (optionally) one or more local party 110, physically collocated with host party 108, can join multiparty communication session 104; and one or more remote party 106, geographically remote, can also join multiparty communication session 104. For the purposes of this description, "geographically remote" can mean a disparate room or environment. Thus, a user who joins multiparty communication session 104 from the same room as host party 108 can be classified as local party 110, whereas the same user joining from a different room or building or halfway across the globe can be classified as remote party 106.

Figure 2:
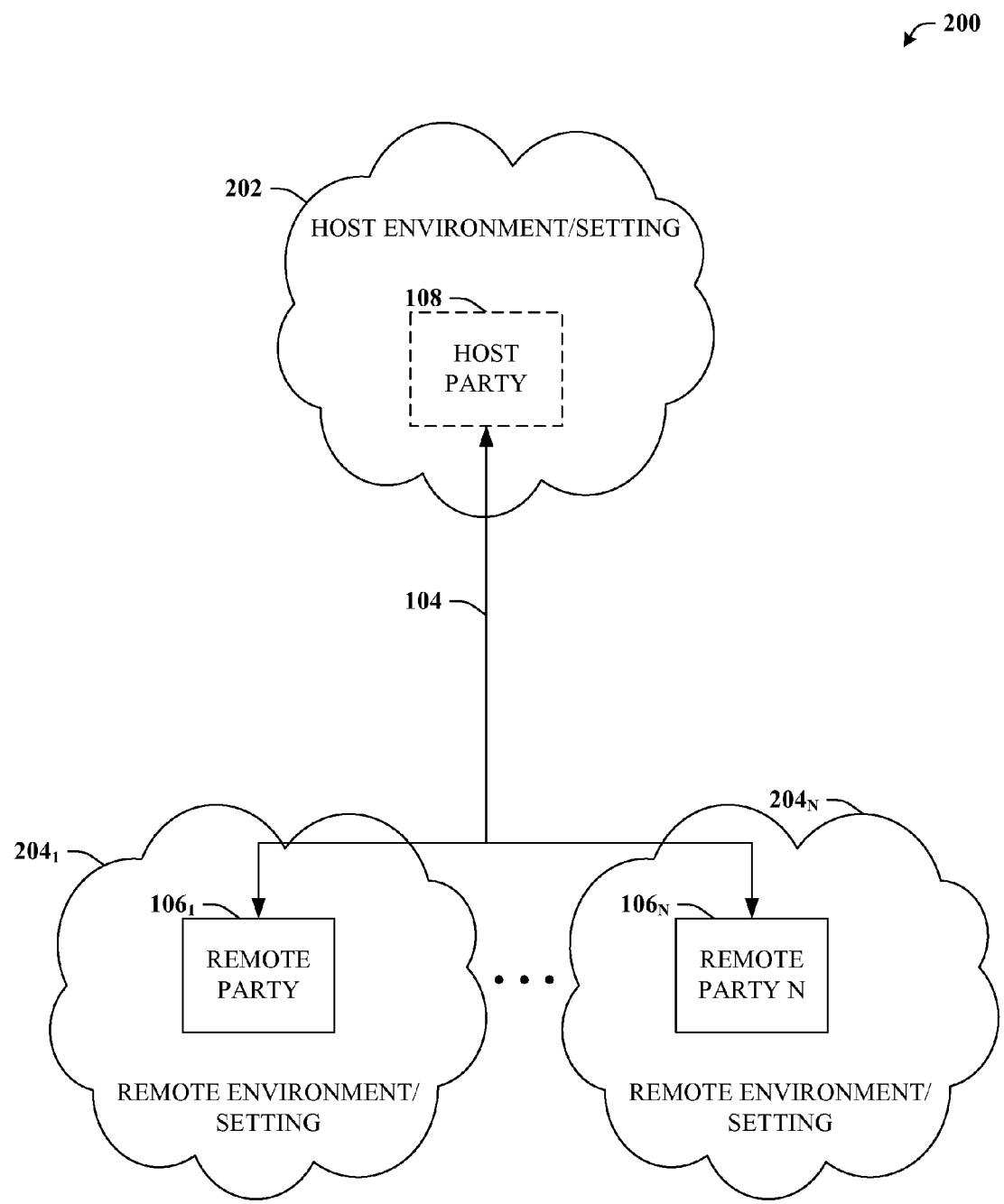
FIG. 2 provides a graphic illustration of a telepresence embodiment.

As another example, multiparty communication session 104 can also be a telepresence session that relates to a telepresence environment or setting, which is further discussed in connection with FIG. 2. FIG. 2 provides graphic illustration 200 of a telepresence embodiment, which can be referenced now before completing the discussion of FIG. 1. As depicted, host party 108 can host multiparty communication session 104 for connecting host party 108 and one or more remote party 106. One distinction between telepresence-based communication over, say, a video conference call is that telepresence seeks to simulate, project, or present a hosted environment or setting (e.g. host environment/setting 202), then allow remote participants to project or experience a presence in the host environment 202 or to interact or affect in some way host environment 202. Therefore, host environment 202 can be a virtual or modeled environment, but as used herein, it will typically be a real, physical environment upon which such virtual or modeled environments are based.

Thus, if host party 108 is in, e.g., a conference room, that conference room can serve as host environment 202 in which remote parties 106 can experience presence by way of telepresence techniques or technologies. However, it should be appreciated that although host party 108 is illustrated as included in host environment 202, such need not necessarily be the case. Rather, host party 108 might well be remote from host environment 202 (e.g., the suitable conference room), but leverage that remote setting for desirable features in order to set up the telepresence host environment 202. Therefore, it should also be appreciated that local parties 110 can be either included in host environment 202 or be collocated with host party 108 at another location. Otherwise, any participant to join multiparty communication session 104 will typically be deemed a remote party 106.

Accordingly, remote parties 106, regardless of where they are relative to host party 108 and/or host environment 202, will also be associated with a real physical environment (e.g. remote environment $204_1$-$204_N$). Naturally, multiple remote parties 106 can be collocated and therefore exist in a shared remote environment 204, but for the sake of simplicity, all remote parties are depicted here to exist in separate remote environments 204.

Turning back to FIG. 1, system 100 can also include interface component 112 that can provide public channel 114. Interface component 112 can further provide private channel 114. Channels 112 and 114 can be conduits by which information (e.g. communication 118) is exchanged between parties to multiparty communication session 104. Thus, any communication 118 received by or transmitted to a user (who could be any one of the depicted parties 106, 108, 110) can be propagated by way of public channel 114 or private channel 116. In more detail, public channel 114 can present or transmit public communication that can be received by substantially all connected parties. In contrast, private communication can be presented or transmitted via private channel 116 and will typically only be received by one or a small, select subset of all connected parties. For example, in a conventional conference call, communication from one party is typically received by all other parties. In addition to this feature, interface component 112 can also provide private communication (by way of private channel 116) to select parties, for instance by way interface selection features for designating a private communication to one or more participants. Likewise, interface component 112 can receive and present private communications transmitted over private channel 116 when the user is selected by other parties as the target of private communication.

System 100 can also include audio transformation component 120 that can apply audio transform 122 to an audio portion of communication 118 propagated by way of public channel 114 or private channel 116. Appreciably, audio transformation component 120 can apply audio transform 122 to either incoming or outgoing communications 118 in order to preprocess the audio portion prior to presentation by interface component 112 (e.g., incoming communications 118) to a user; or prior to transmission by interface component 112 (e.g. outgoing communication 118) to other parties. Audio transformation component 120 can be configured to apply a variety of audio transforms 122 to communication 118, yet the particular audio transform 122 that is applied can be based upon the originator or the target audience 124 of the communication 118. Additional detail relating to the types of audio transforms 122 is provided in connection with FIG. 3A, while example target audiences 124 are illustrated in more detail in connection with FIG. 3B.

In addition, it should be understood that system 100 can also include or be operatively connected to data store 126. Data store 126 is intended to be a repository of all or portions of data, data sets, or information described herein or otherwise suitable for use with the claimed subject matter. Data store 126 can be centralized, either remotely or locally cached, or distributed, potentially across multiple devices and/or schemas. Furthermore, data store 126 can be embodied as substantially any type of memory, including but not limited to volatile or non-volatile, sequential access, structured access, or random access and so on. It should be understood that all or portions of data store 126 can be included in system 100, or can reside in part or entirely remotely from system 100.

Figure 3A:
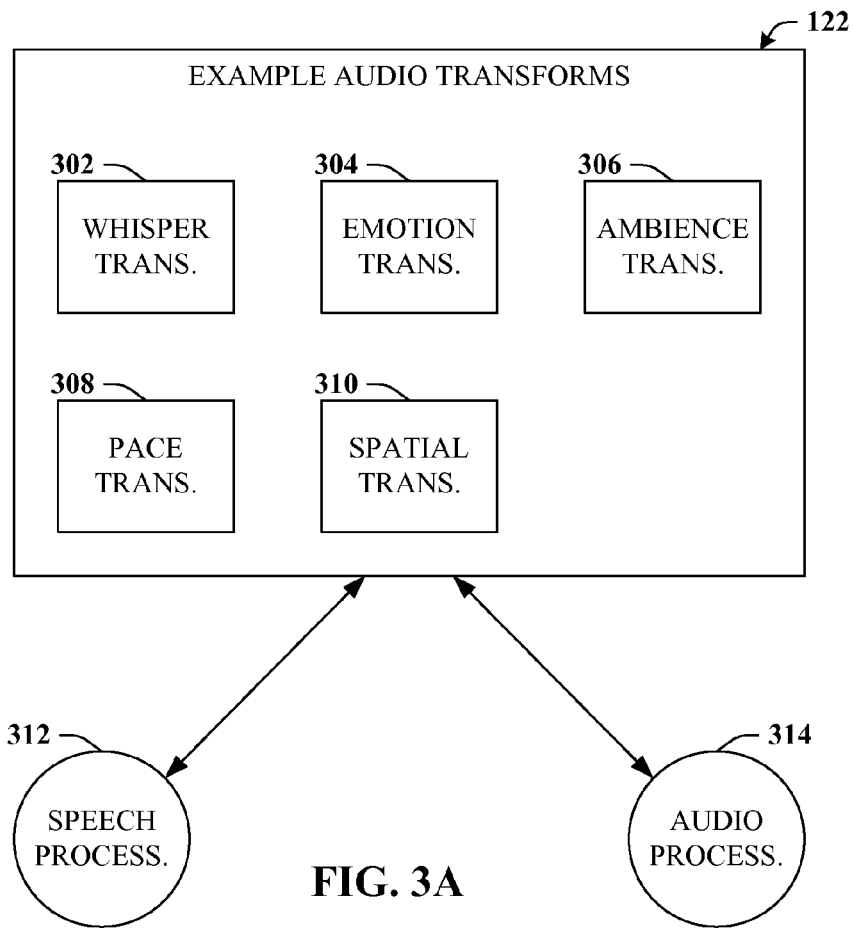
FIG. 3A graphically depicts additional detail relating to various example types of audio transforms 122.
Figure 3B:
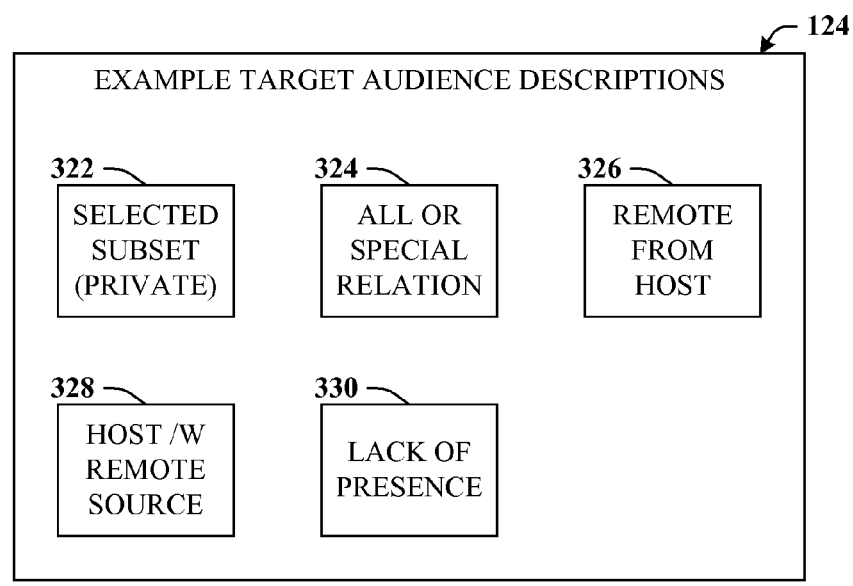
FIG. 3B graphically depicts example target audiences 124 in more detail.

Turning simultaneously now to FIGS. 3A and 3B, FIG. 3A provides additional detail in connection with a variety of example audio transforms 122, while FIG. 3B illustrates a number of example target audience 124 descriptions. As introduced supra, audio transformation component 120 can apply a variety of audio transforms 122 based upon a type of target audience 124. For example, audio transformation component 120 can apply whisper transform 302. Whisper transform 302 can employ speech processing techniques 312 to convert normal speech input to communication 118 into simulated whispered speech. Audio transformation component 120 can apply whisper transform 302 to a private communication propagated over private channel 116, which is illustrated by select subset 322. In other words, when communication 118 is propagated over private channel 116, communication 118 is therefore known to be a private communication and target audience 124 is known to be a subset of all connected parties.

In such a case, whisper transform 302 can be extremely useful, e.g. to provide an audio cue to selected subset 322 that communication 118 is private rather than public, and therefore intended only for a particular target or a subset. Appreciable, many conventional multiparty communication systems or services do not offer private channels. Rather, any communication information submitted to the system is provided to all connected parties uniformly. However, providing private communications to an individual party or select subsets can provide countless benefits such as discreet reminders to a current speaker or presenter, personal communique, communications that do not interrupt the meeting flow or objectives, and so on. It should be appreciated that in addition or in the alternative to transforming normal speech to sound like whispered speech, whisper transform 302 can also precede the speech with a brief tone or melody that is indicative of private communication and/or non-public communication.

In real, physical meeting settings, private communications occur quite often. For example, it is a common occurrence for one participant to lean close to another to make a comment to the target participant. In this case, the target inherently understands that the information communicated is private and/or intended just for her or to those within auditory range because a number of implicit cues exist, such as the visual cues of the source participant's body language (e.g., leaning over, covering one's mouth to muffle or aim vocalization . . . ) and the auditory cues (e.g. whispering or speaking more softly). However, in a teleconference or similar setting, such cues do not normally exist. Rather, a private communication output by the target's audio device speakers might sound no different to the target than public communications received by that target. Such a situation might easily lead to confusion or awkward results due to the fact that private communications are not readily distinguishable by the target from public ones. However, such difficulties can be mitigated by applying whisper transform 302 to private communications.

It should be appreciated that in the event that selected subset 322 is in close proximity to other participants to multiparty communication session 104 (e.g., in a conference room with some of the participants to session 104), additional features can be employed. For example, in the case where selected subset 322 is utilizing a headset or earphones, then communications 118 will be inherently private. For instance communications 118 over public channel 114 can be output by fixed loudspeakers, whereas communications 118 over private channel 116 can be output to the proper headset. However, when employing only ordinary fixed loudspeakers to output communications 118 from private channel 116, additional challenges arise due to the potential for nearby participants (some whom are potentially not members of selected subset 322) to overhear such communications, even after applying whisper transform 302.

Accordingly, in one or more aspects of the claimed subject matter, whisper transform 302, or any non-public communication 118 or any communication 118 intended for selected subset 322, can employ techniques or technologies associated with audio beaming or "spotlighting." Audio beaming provides sound in a narrow beam that can be aimed at desired locations, wherein the sound is substantially perceptible only within a limited physical area around the aimed location. In other words, if the above-mentioned conference room (or other suitable location) is sufficiently equipped, then communications over private channel 116 and/or those directed to selected subset 322 with some members of selected subset 322 in the conference room can be broadcast to a limited physical area that is associated with one or more members of select subset 322. Thus, local members can transmit private messages to other local members without the fear of offending others by leaning over to convey private vocalizations to a neighbor and/or without fear of violating some manner of etiquette or protocol. Moreover, both local and remote participants can transmit private messages to target audience 124 included in a conference room or otherwise in close proximity to other participants without fear that the communication will be overheard by others. It should be further understood that audio beaming can track specific participants rather than designated areas. Accordingly, even if a member of target audience 124 changes seats or otherwise moves around in the room, the associated hardware audio beaming equipment can track that particular target 124.

Typically, whisper transform 302 will be applied to outgoing communications 118 transmitted by way of private channel 116. However, it should be appreciated that whisper transform 302 can also be applied by audio transformation component 120 to incoming communications 118 as well (e.g., in the case that communications 118 received by way of private channel 116 were not already transformed at the source before transmission to the target).

As another example of audio transform 122, audio transformation component 120 can apply emotion transform 304. Emotion transform 304 can employ speech processing techniques 312 in order to dampen, modify, or remove speech characteristics associated with an undesired emotion or behavior. For example, speech characteristics that indicate a party is upset or angry might be deemed inappropriate to one or more participant who is a target of communication 118. Likewise, speech characteristics that indicate timidity, uncertainty, or the like might also be deemed inappropriate to some or all targets of communication 118, or associated behaviors such as stuttering. Appreciably, emotion transform 304 can be applied based upon characteristics of each target such that one participant might receive a transformed communication 118, while another participant does not or receives a different emotion transform. For instance, characteristics of anger can be filtered when the target is a superior, yet not filtered to a close confidant or subordinate. Thus, audio transformation component 120 can apply emotion transform 304 to public communication, or apply emotion transform selectively to private communications or in some cases selectively to public communications. Moreover, emotion transform 304 can be applied based upon special relation 324 (e.g., superior, subordinate, close friend, mere acquaintance, etc.).

As a further example an audio transform 122, audio transformation component 120 can apply ambience transform 306, typically when the target is remote from the host or when the host is the target from a remote source, both of which are exemplified by reference numerals 326 and 328, respectively. More specifically, ambience transform 306 can employ speech processing techniques 312 and/or audio processing techniques 314 in order to, e.g. insert, substitute, or interpolate target ambient acoustic features. For instance, when a participant provides communication 118, such as speaking during a conference call, then in addition to the express vocalizations, communication 118 will often include background noise or other ambience characteristics. As such, it can sometimes be desirable to employ ambience characteristics of other locations or to otherwise provide a subtle mood or cue as to a current speaker.

For example, consider multiparty communication session 104 in which one particular party is traveling. When that particular party contributes to the discussion, a subtle background ambience such as traffic or airport sounds can be presented. Similarly, suppose several parties are at different locations around the globe, each can have a subtle background ambience to reflect local color and/or a particular locale. Such ambient features, though subtle, can provide auditory cues to aid in identifying a particular speaker. In a similar vein, each party to multiparty communication session 104 can be associated with an introductory chime or chord somewhat akin to a personalized ring tone, which can also be useful to help identify or distinguish.

In one or more aspects of the claimed subject matter, ambience transform 306 can employ speech 312 or audio 314 processing techniques to insert, substitute, or interpolate host environment 202 ambient acoustic features. For example, consider remote party 106 whose own remote environment 204 will include ambient characteristics that are distinct from that of host environment 202. However, especially in the case of a telepresence session, it can be beneficial to remove the ambient characteristics of remote environment 204 and/or insert the ambient characteristics (e.g., the detected reverb, etc.) of host environment 202. Accordingly, when remote party 106 contributes, the background ambience is similar to that which would exist if remote party 106 was actually present in host environment 202.

Additionally or alternatively, ambience transform 306 can employ such techniques 312, 314 in order to dampen, modify, or remove source ambient acoustic features. For instance, as detailed above, background or ambient sounds can be suppressed to facilitate or modify features of presence. Additionally, various undesired sounds or behaviors can also be suppressed such as background vocalizations, verbalizations, or other loud sounds, coughing, sneezing, or the like. As discussed above, audio transformation component 120 can apply ambience transform 306 based upon a relative geography between target audience 124 and either host environment 202 or a communication source, as represented by target audience examples 326 and 328.

Audio transformation component 120 can also apply pace transform 308 and/or spatial transform 310. Pace transform 308 can employ speech processing techniques 312 in order to simulate normal speech pitch or frequency characteristics for communications output at a faster-than-normal playback rate based upon lack of presence 330, which is discussed in more detail in connection with FIG. 4. In contrast, spatial transform 310 can employ speech 312 or audio 314 processing techniques in order to provide audio three-dimensional (3D) stereo features based upon a location map and a device array based upon target audience examples 326 and 328, which is further detailed in connection with FIG. 5.

Moreover, speech processing techniques 312 and audio processing techniques 314 can relate to preprocessing based upon tone, inflection, pitch, frequency, volume, reverberation and so forth; any or all of which can be employed by example audio transforms 302-310, or other suitable audio transform 122. Furthermore, whenever audio transformation component 120 is applied at the receiver side, the receiver may have partial or total control of the transform. For example, the decision of applying the whisper transform for private communications may be turned on only by users who desire to employ the feature. Similarly, a user may decide to make a superior's voice stronger or more reverberant, e.g., to indicate a degree of importance. Additionally or alternatively, the user might decide to apply, say, a Mickey Mouse transform to the superior's voice to, e.g. lighten the mood.

Figure 4:
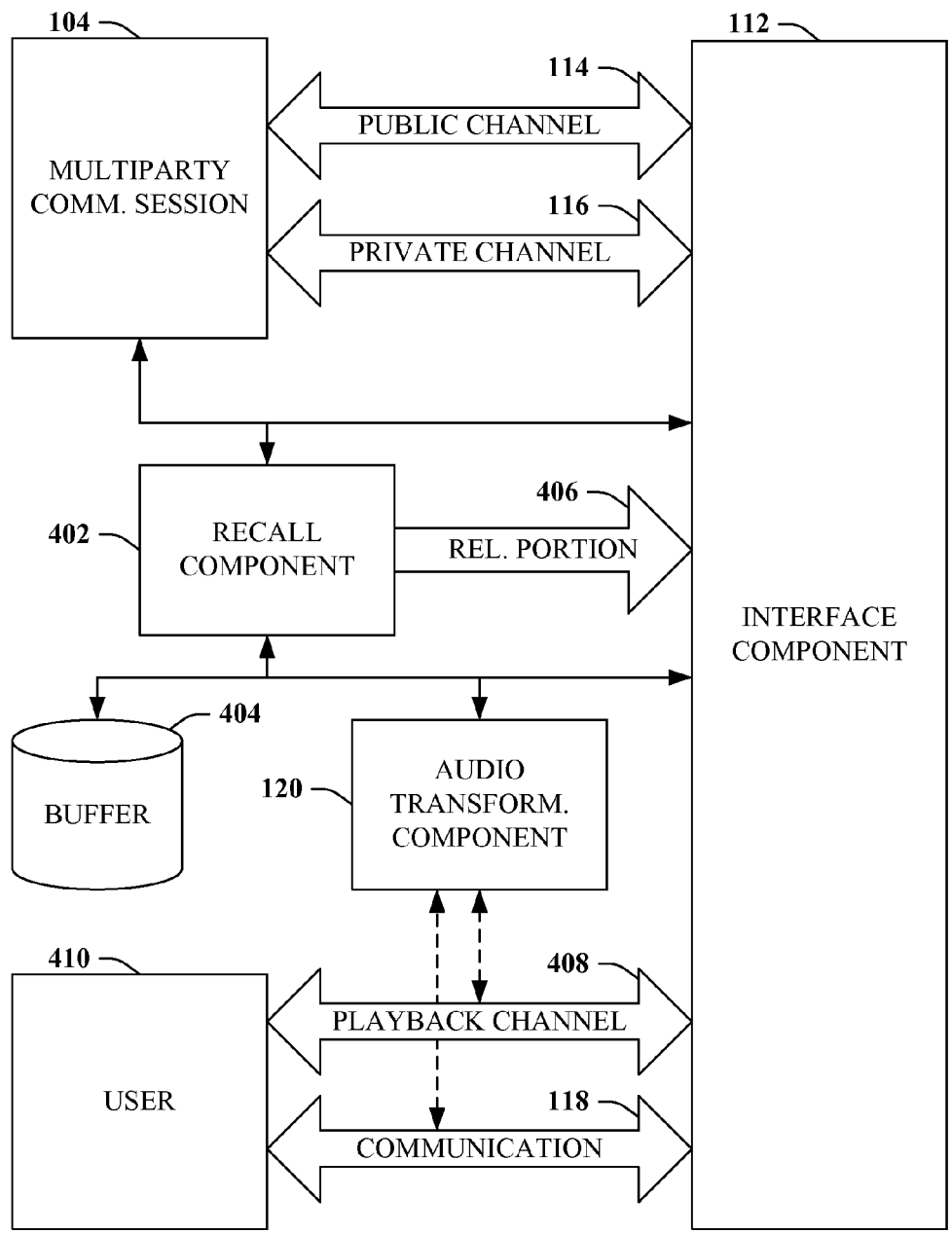
FIG. 4 illustrates a block diagram of a system that can provide, inter alia, a pace transform to an audio portion of a communication to enrich multiparty communication environments.

Referring now to FIG. 4, system 400 that can provide, inter alia, a pace transform to an audio portion of a communication to enrich multiparty communication environments is illustrated. Typically, system 400 can include interface component 112 that can provide public channel 114 for public communications received by substantially all parties to multiparty communication session 104. Interface component 112 can also provide private channel 116 for private communications received by a select subset of parties to multiparty communication session 104. In addition, system 400 can include audio transformation component 120 that can apply audio transform 122 as substantially described supra, in particular, pace transform 308.

Moreover, system 400 can include recall component 402 that can record multiparty communication session 104, to e.g. buffer 404, which can be included in or operatively coupled to data store 126. Recall component 402 can automatically replay relevant portion 406 of multiparty communication session 104 by way of playback channel 408 provided by interface component 112. In more detail, relevant portion 406 can be characterized by a lack of presence 330 for user 410, wherein user 410 can be substantially any party 106, 108, or 110 to multiparty communication session 104.

Thus, communications 118 that occur for multiparty communication session 104 in which user 410 was not present (e.g., entered late, left for a brief period, or was otherwise disengaged) can be selected by recall component 402 and delivered to interface component 112 as relevant portion 406. Relevant portion 406 can be output over playback channel 408 to user 410 at a faster-than-normal playback rate (e.g., 2×, 3×, 4× . . . ) to facilitate catching up on portions of multiparty communication session 104 in which user 410 had lack of presence 330. Furthermore, audio transformation component 120 can apply pace transform 308 such that verbalizations or vocalizations at higher speeds do not sound unnatural.

Figure 5:
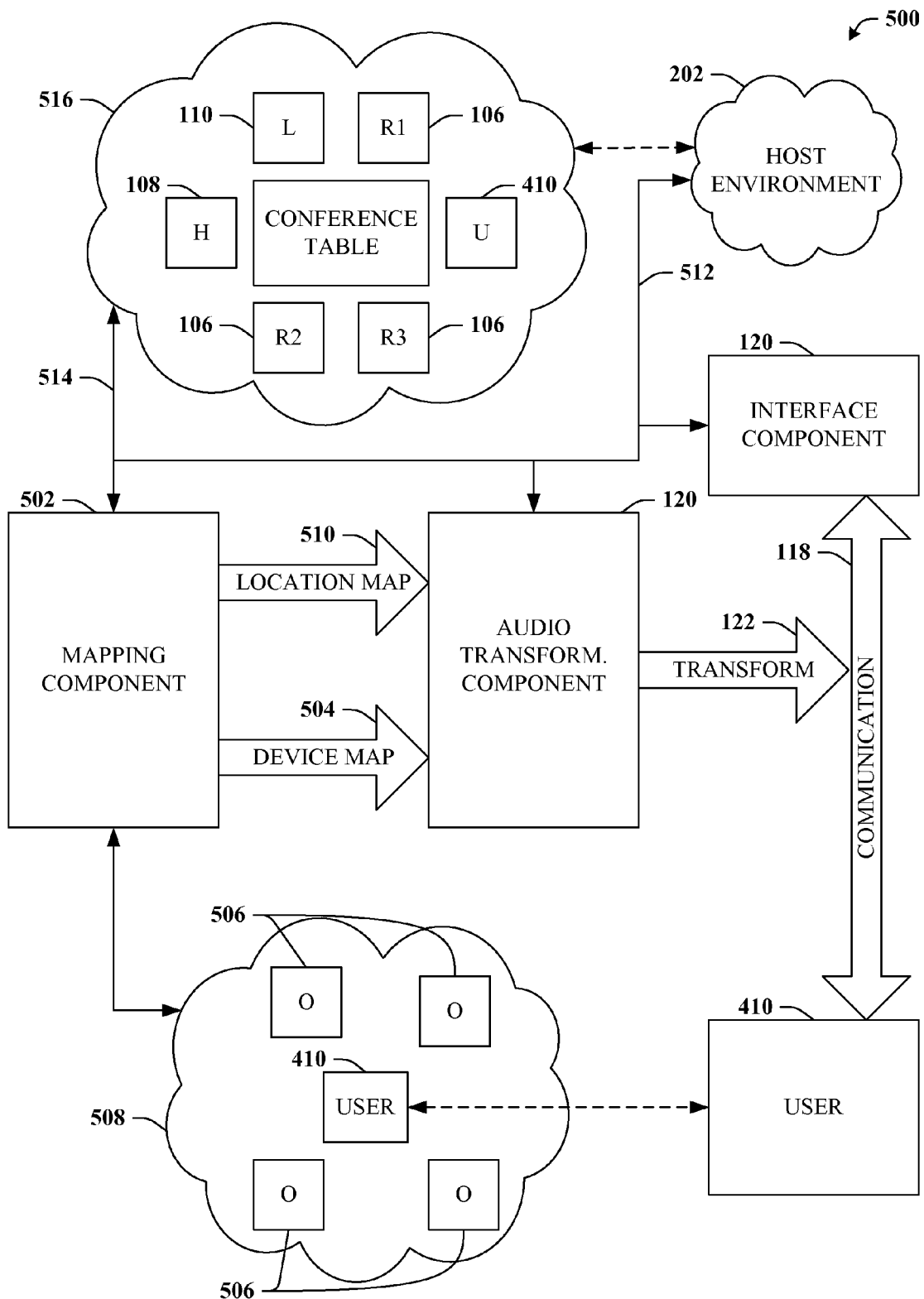
FIG. 5 is a block diagram of a system that can provide, inter alia, a spatial transform to an audio portion of a communication to enrich multiparty communication environments.

Turning now to FIG. 5, system 500 that can provide, inter alia, a spatial transform to an audio portion of a communication to enrich multiparty communication environments is provided. System 500 can include interface component 112 as well as audio transformation component 120, both as substantially described supra. As depicted, audio transformation component 120 applies audio transform 122 to communications 118 to or from user 410 (e.g., remote party 106, host party 108, or local party 110), wherein audio transform 122 can be spatial transform 310. Spatial transform 310 can provide various audio 3D stereo features based upon device array map 504 and location map 510, which can be constructed by mapping component 502.

For example, especially in the case of telepresence sessions, it can be beneficial to provide or simulate presence in a host environment (e.g., host environment 202). Thus, even though user 410 is not physically located in host environment 202, audio transforms 122 such as ambience transform 306 or spatial transform 310 can be applied simulate that presence. For instance, the ambience of host environment 202 can be inserted into communications 118 from user 410 as detailed previously. Likewise, even though various other parties are not physically present in host environment 202, ambience features and 3D stereo features can be employed to simulate such to a remote listener such as user 410.

In particular, mapping component 502 can construct device array map 504 based upon respective locations associated with local audio output devices 506. Output devices 506 can be, e.g. an array of speakers included in a physical, local environment 508 of user 410. Hence, device array map can include these respective locations as well as a general location and orientation of user 410 within local environment 508. In addition mapping component 502 can receive (or if local to host environment 202, then mapping component 502 can construct) location map 510. Location map 510 can be constructed based upon acoustic characteristics 512 of host environment 202 as well as positions 514 within model 516 of host environment 202 that are virtually assigned to each party in multiparty communication session 104.

More particularly, host environment 202 can be a conference room with a conference table in the center of the room. Actual acoustic characteristics 512 of host environment 202 can be obtained for various audio transforms 122. In addition, whether physically present in host environment 202 or not, parties joining multiparty communication session 104 can be assigned virtual locations within modeled environment 516, for instance, at positions 514 around the modeled conference table. In this case, host party 108 and user 410 are assigned end positions, with local party 110 and a number of remote parties 106 at other locations. Should more parties join, the conference table can be expanded to seat additional participants. Appreciably, based upon these known positions 514, spatial transform 310 can be applied such that communications 118 from any party to the multiparty communication session 104 can to other parties as though spoken from different locations.

Accordingly, given user 410 is depicted here to be associated with local environment 508, it can be understood that user 410 is remote from host environment 202. However, user 410 is assigned a virtual location in model 516, and thus, vocalizations from any other party (from the perspective of modeled environment 516) will naturally be perceptively different based upon the origin of the vocalizations. For instance, again from the perspective of model 516, when remote party 106 labeled R1 speaks, user 410 will hear the vocalizations from the right. In contrast, when remote party 106 labeled R3 speaks, user 410 will hear the vocalizations from the left. Naturally, when host party 108 speaks, user 410 will hear those sounds as though they originated directly in front, perhaps at a farther distance away. Hence, although user 410 is not physically present and, further, all or many other parties themselves can be remote as well; user 410 can hear vocalizations from his or her own assigned position 514 as though each vocalization originates from another of the assigned positions 514.

Figure 6:
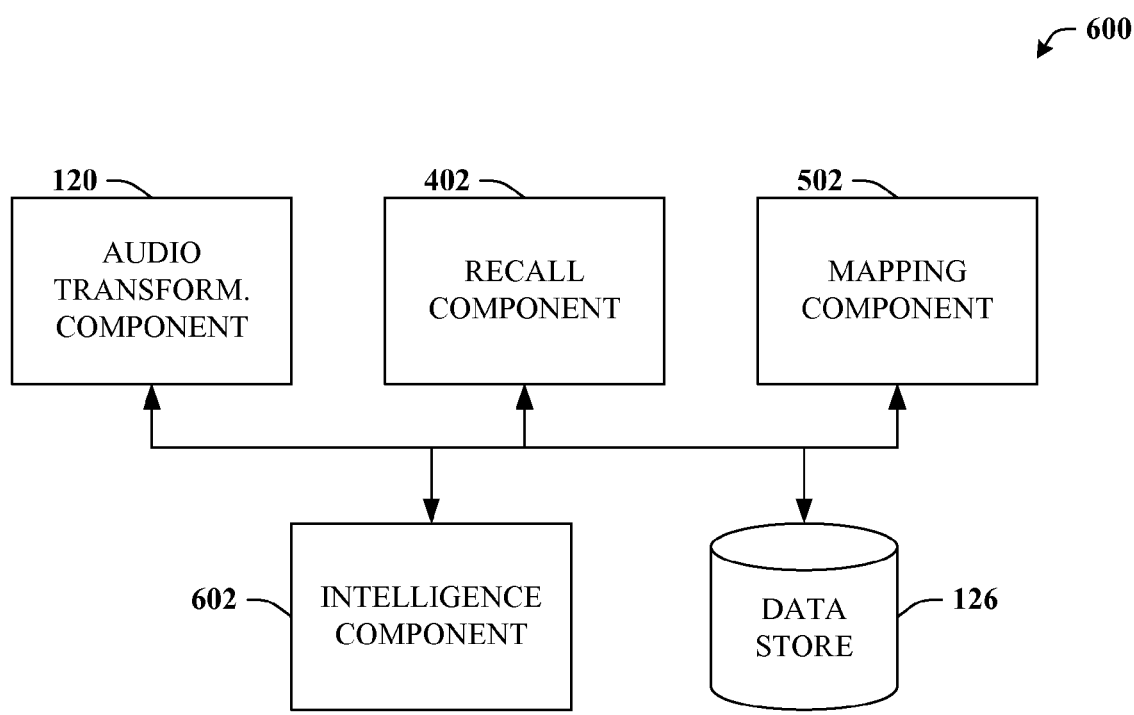
FIG. 6 is a block diagram of a system that can provide for or aid with various inferences or intelligent determinations.

Referring now to FIG. 6, system 600 that can provide for or aid with various inferences or intelligent determinations is depicted. Generally, system 600 can include audio transformation component 120, recall component 402, and mapping component 502 as substantially described herein. In addition to what has been described, the above-mentioned components can make intelligent determinations or inferences. For example, audio transformation component 120 can intelligently determine or infer which type of audio transform 122 to apply as well as when and/or for whom to apply audio transforms 122. Recall component 402 can also employ intelligent determinations or inferences in connection with, e.g. identifying a lack of presence or more particularly, identifying relevant portion 406.

For example, relevant portion 406 need not be all the content or communications 118 that occurred in a particular user's absence. Rather, recall component 402 can intelligently filter some content based upon, e.g., priority, identity of a speaker, pauses or silence, inferred levels of excitement, and so on. In addition, mapping component 502 can intelligently determine or infer a setup for modeled environment 516. Any of the foregoing inferences can potentially be based upon, e.g., Bayesian probabilities or confidence measures or based upon machine learning techniques related to historical analysis, feedback, and/or other determinations or inferences.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of audio transformation component 120, recall component 402, or mapping component 502 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein, such as data store 126, and can be employed for performing one or more speech 312 or audio 314 processing techniques referred to herein.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
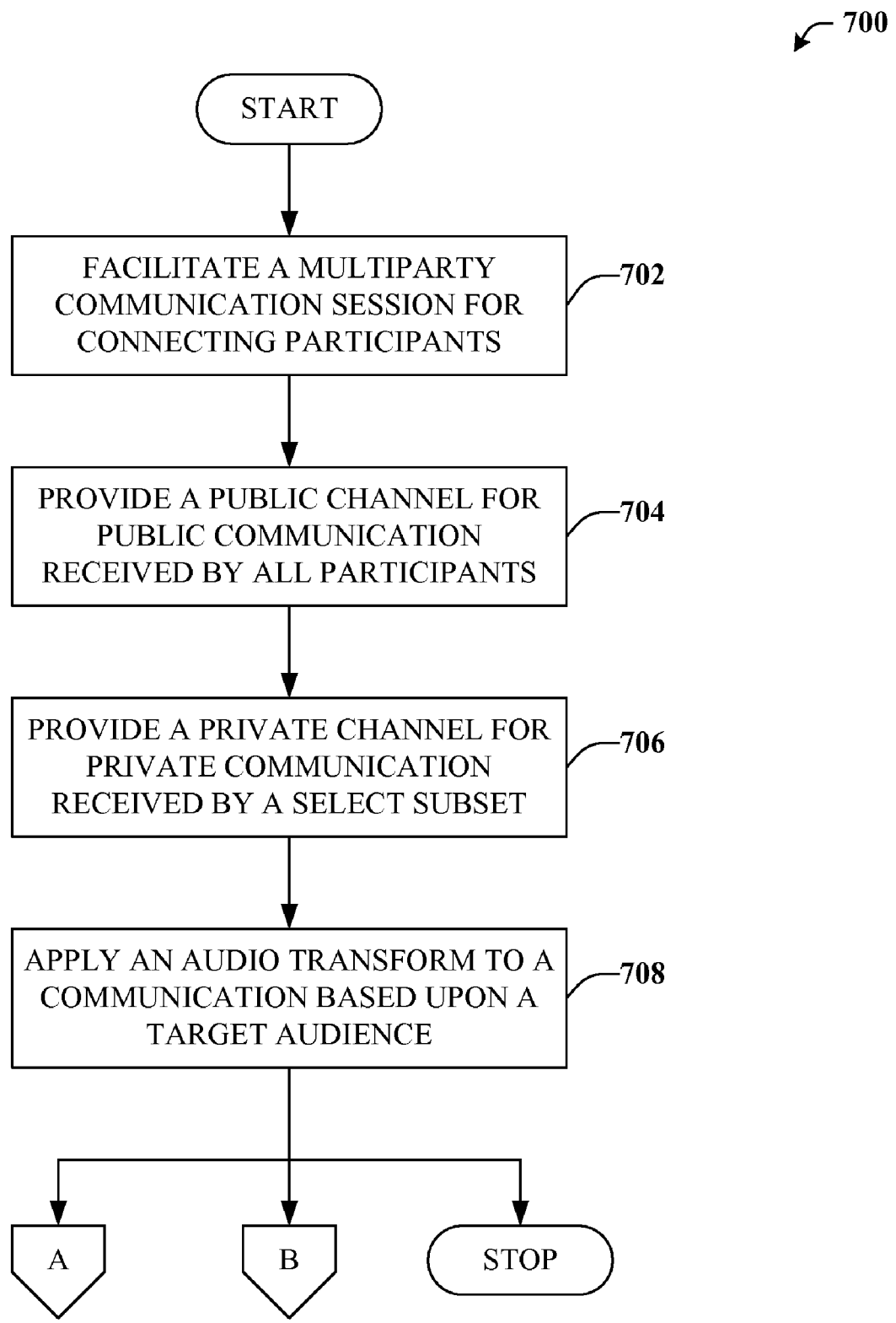
FIG. 7 depicts an exemplary flow chart of procedures that define a method for enriching multiparty communication environments based upon acoustic preprocessing.
Figure 8:
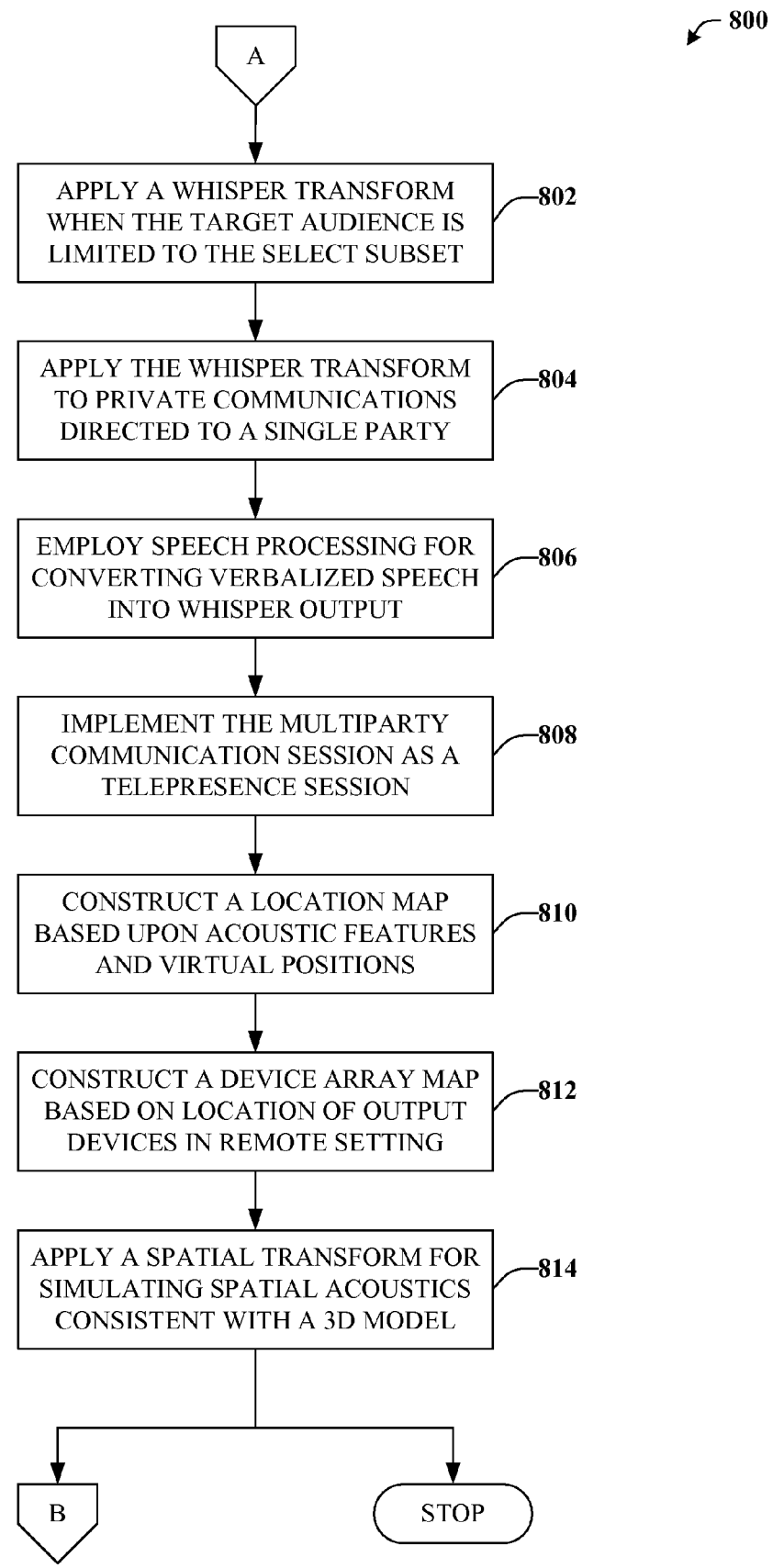
FIG. 8 illustrates an exemplary flow chart of procedures that define a method for enriching multiparty communication environments by way of a whisper transform or a spatial transform.
Figure 9:
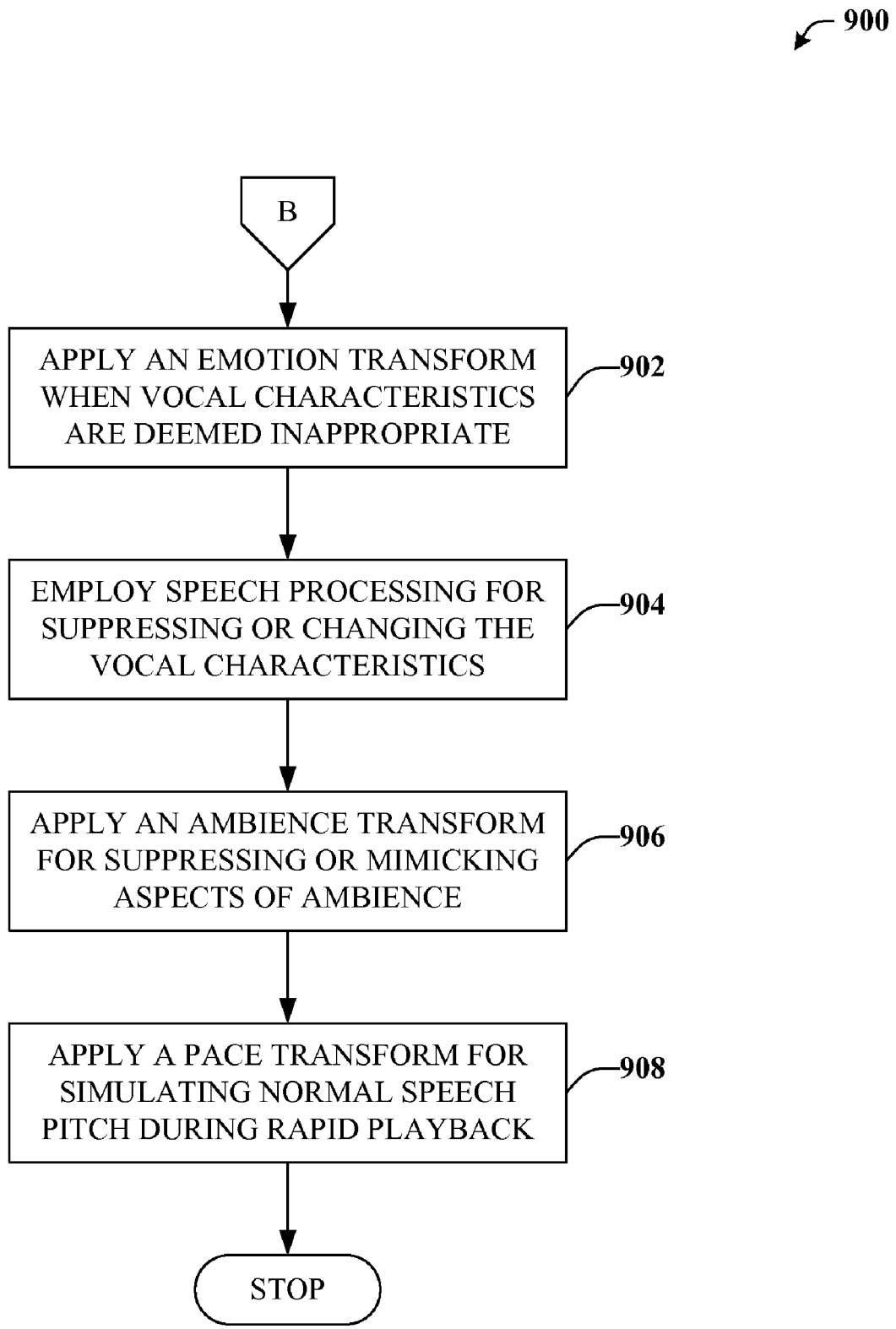
FIG. 9 depicts an exemplary flow chart of procedures defining a method for enriching multiparty communication environments by way of emotion, ambience, or pace transforms.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for enriching multiparty communication environments based upon acoustic preprocessing is illustrated. Generally, at reference numeral 702, a multiparty communication session can be facilitated for communicatively connecting at least three participants. For example, a host can provide the multiparty communication session and two remote participants can join the multiparty communication session.

Regardless of whether the multiparty communication session is hosted or joined, at reference numeral 704, a public channel can be provided for presenting or transmitting a public communication received by substantially all connected participants. Naturally, public communications from other participants can be presented, whereas public communication from the associated user can be transmitted. At reference numeral 706, a private channel can be provided for presenting or transmitting a private communication received by a select subset of all connected participants.

At reference numeral 708, a processor can be employed for applying an audio transform to an audio portion of a communication propagated by way of the public channel or the private channel based upon a target audience of the communication. Typically, the audio portion that is transformed will be for a communication that is transmitted by the associated user in an outgoing fashion. However, it should be appreciated that the communications received by the user (a target) in an incoming fashion can be transformed as well.

Referring to FIG. 8, exemplary computer implemented method 800 for enriching multiparty communication environments by way of a whisper transform or a spatial transform is depicted. At reference numeral 802, a whisper transform can be applied when the target audience is limited to a select subset of all connected participants. For example, at reference numeral 804, the whisper transform can be applied to private communications propagated over the private channel and directed to a single participant. Appreciably, at reference numeral 806, speech processing techniques for converting normal speech input into output resembling corresponding whispered speech vocalization in order to effectuate the whisper transform.

Next to be described, at reference numeral 808, the multiparty communication session can be implemented as a telepresence session based upon a host setting or environment. In particular, the host setting can be employed as the meeting place for connected participants or the host setting can be modeled for that purpose. In either case, remote participants can extend a presence in the host setting. At reference numeral 810, a location map can be constructed based upon acoustic features associated with the host setting. In addition, the location map can be constructed based upon virtual position assignments of each participants of the communication session mapped to a 3D model of the host setting.

Furthermore, at reference numeral 812, a device array map can be constructed based upon respective locations associated with audio output devices included in a remote setting. For example, the location map can include a geometric position of output speakers as well as a general location of the associated user within the location map. At reference numeral 814, a spatial transform can be applied for simulating spatial acoustics consistent with the 3D model when the target audience is remote from the host setting.

With reference now to FIG. 9, method 900 for enriching multiparty communication environments by way of emotion, ambience, or pace transforms is illustrated. At reference numeral 902, an emotion transform can be applied when an identified vocal characteristic associated with an emotion or behavior is deemed inappropriate for the target audience. For example, indicia of anger, insecurity, stuttering or the like can be identified At reference numeral 904, speech processing techniques can be employed for suppressing or changing the identified vocal characteristic in order to effectuate the emotion transform.

In addition, at reference numeral 906, an ambience transform can be applied for suppressing or mimicking aspects of ambience when the target audience is remote from a host setting or environment. For example, the ambience transform can allow a participant to effectuate background or ambience features of an environment that differs from the local, physical environment associated with the participant, such as mimicking a host setting or another appropriate setting. Likewise, various ambient features can be suppressed such as loud noises, coughing, or the like.

At reference numeral 908, a pace transform can be applied for simulating normal speech pitch or frequency characteristics during rapid playback of recorded communications. In one or more aspects of the claimed subject matter, the rapid playback and the pace transform can be applied when the target audience is associated with missing presence during the communication session. For instance, when the target joins the communication session late, or steps out for a few minutes. In these or other cases, rapid playback can allow that participant to quickly catch up on missed communications, and the pace transform can be applied so that the playback does not sound unnatural.

Figure 10:
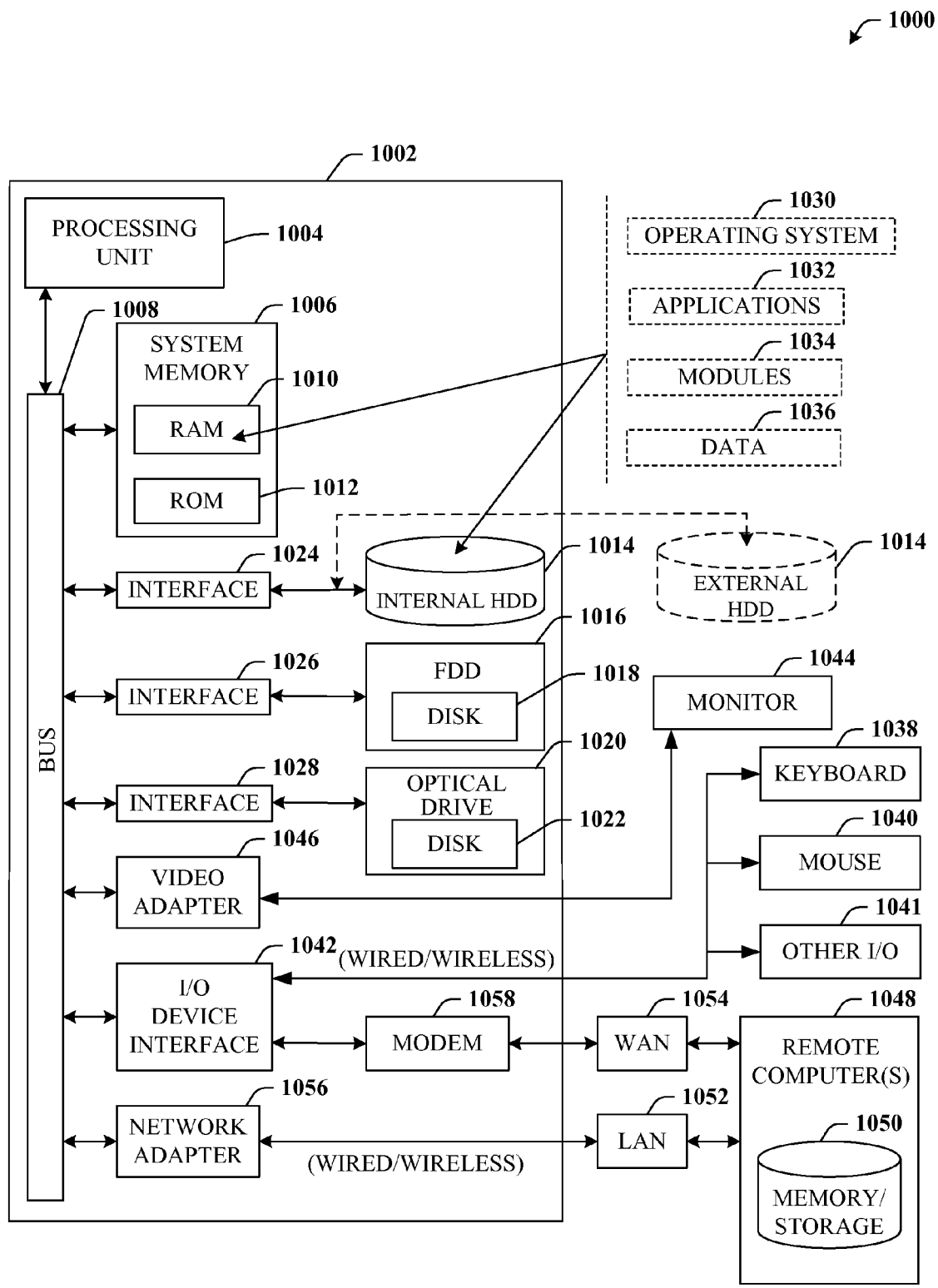
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices 1041 may include a speaker, a microphone, a camera or another imaging device, an IR remote control, a joystick, a game pad, a stylus pen, touch screen, or the like. These and other input devices are often connected to the processing unit 1004 through an input-output device interface 1042 that can be coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
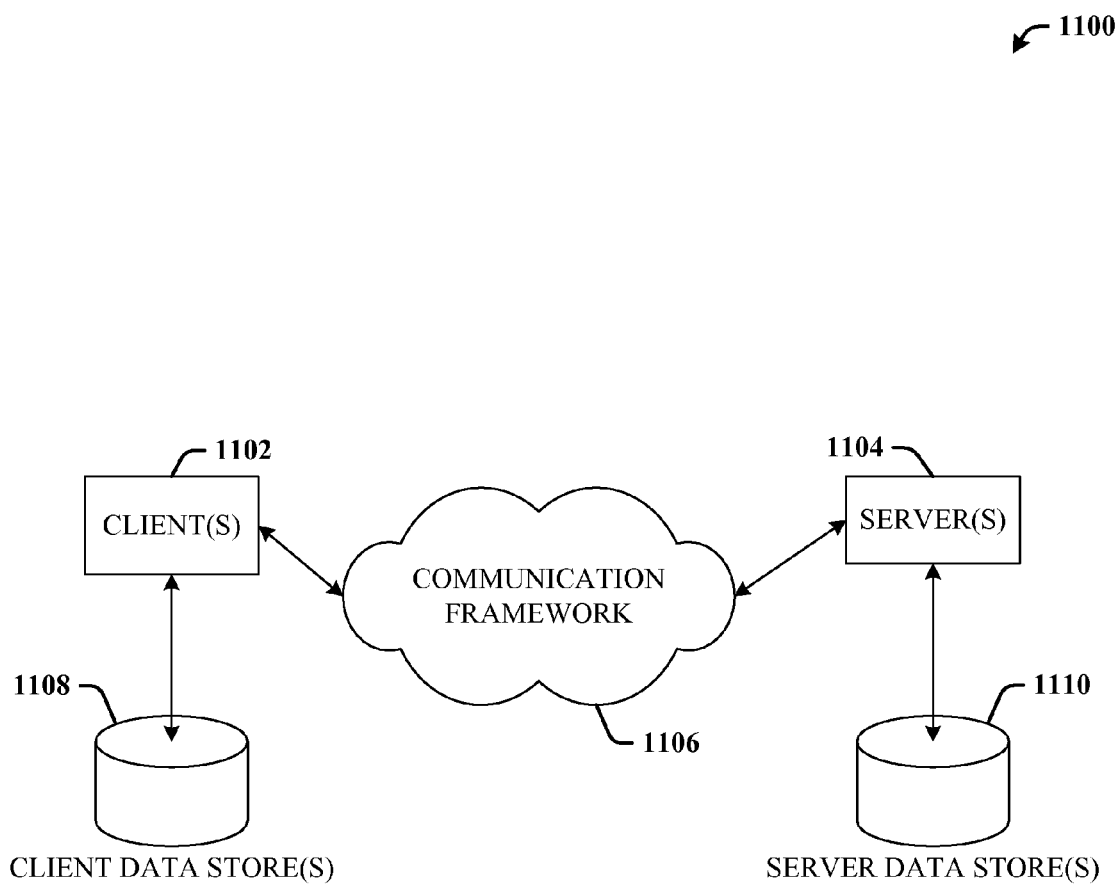
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that preprocesses audio portions of communication to enrich multiparty communication environments, comprising:
   a connection component that hosts or joins a multiparty communication session in which at least one party is a remote party;
   an interface component that provides a public channel to present or transmit a public communication received by substantially all connected parties, and that further provides a private channel, simultaneously with the public channel, to present or transmit a private communication received by a selected subset of all connected parties; and
   an audio transformation component that applies an audio transform to an audio portion of a communication over the public channel or the private channel in order to preprocess the audio portion prior to presentation or transmission of the communication by the interface component, the audio transform being based at least in part on a target audience of the communication.

2. The system of claim 1, the multiparty communication session is a telepresence session in which the remote party maintains a presence in a host environment.

3. The system of claim 1, the audio transform is a whisper transform.

4. The system of claim 3, the whisper transform employs speech processing techniques to convert normal speech input to the communication into simulated whispered speech.

5. The system of claim 3, the audio transformation component further:
   applies the whisper transform to a private communication propagated over the private channel;
   precedes the private communication with a tone or melody indicative of private communication, the private channel being delivered to one or more devices associated with a select subset of all connected parties, and
   employs audio beaming techniques to broadcast the private communication to a limited physical area associated with one or more members of the select subset.

6. The system of claim 1, the audio transform is an emotion transform that employs speech processing techniques to dampen, modify, or remove speech characteristics associated with an undesired emotion or behavior.

7. The system of claim 6, the audio transformation component applies the emotion transform selectively to a public communication or selectively to a private communication.

8. The system of claim 1, the audio transform is an ambience transform.

9. The system of claim 8, the ambience transform employs speech or audio processing techniques to at least one of (1) insert, substitute, or interpolate target ambient acoustic features; (2) insert, substitute, or interpolate host environment ambient acoustic features; or (3) dampen, modify, or remove source ambient acoustic features.

10. The system of claim 8, the audio transformation component applies the ambience transform based at least in part on a relative geography between the target audience and a host environment or a communication source.

11. The system of claim 1, the audio transform is a pace transform that employs speech processing techniques to simulate normal speech pitch or frequency characteristics for communications output at a faster-than-normal playback rate.

12. The system of claim 11, further comprising a recall component that records the multiparty communication session and that automatically replays a relevant portion of the communication session by way of a playback channel provided by the interface component, the relevant portion is characterized by a lack of presence and is output at a faster-than-normal playback rate with application of the pace transform.

13. The system of claim 1, the audio transform is a spatial transform that employs speech or audio processing techniques to provide audio three-dimensional (3D) stereo features based at least in part on a location map and a device array map.

14. The system of claim 13, further comprising a mapping component that constructs the device array map based at least in part on respective locations associated with local audio output devices; and that further constructs or receives the location map that is constructed based at least in part on acoustic characteristics of a host environment and positions within a model of the host environment virtually assigned to each party in the multiparty communication session.

15. A method for enriching multiparty communication environments based at least in part on acoustic preprocessing, comprising:
    facilitating a multiparty communication session for communicatively connecting at least three participants;
    providing a public channel for presenting or transmitting a public communication received by substantially all connected participants;
    providing a private channel for presenting or transmitting a private communication received by a select subset of all connected participants;
    employing a processor for applying an audio transform to an audio portion of a communication propagated by way of the public channel or the private channel based at least in part on a target audience of the communication and a relative geography between the target audience and a host environment or a communication source, the audio transform comprising an ambience transform that employs speech or audio processing techniques to at least one of 1) insert, substitute, or interpolate target ambient acoustic features; (2) insert, substitute, or interpolate host environment ambient acoustic features; or (3) dampen, modify, or remove source ambient acoustic features; and
    providing a remote presence or an auditory cue for identifying a party of the multiparty communication session.

16. The method of claim 15, further comprising at least one of the following acts:
    applying a whisper transform when the target audience is limited to a select subset of all connected participants, and, optionally, preceding the whisper transform with a tone or melody indicative of selective communication;
    applying the whisper transform to private communications directed to a single participant by delivering the private communication to devices associated with the select subset or beaming the private communication to a physical area associated with one or more member of the select subset;
    employing speech processing techniques for converting normal speech input into output resembling corresponding whispered speech vocalization in order to effectuate the whisper transform;
    implementing the multiparty communication session as a telepresence session based at least in part on a host setting;
    constructing a location map based at least in part on acoustic features associated with the host setting and virtual position assignments of each participant of the communication session mapped to a 3D model of the host setting;
    constructing a device array map based at least in part on respective locations associated with audio output devices included in a remote setting; or
    applying a spatial transform for simulating spatial acoustics consistent with the 3D model when the target audience is remote from the host setting.

17. The method of claim 15, further comprising at least one of the following acts:
    applying an emotion transform when an identified vocal characteristic associated with an emotion or behavior is deemed inappropriate for the target audience;
    employing speech processing techniques for suppressing or changing the identified vocal characteristic in order to effectuate the emotion transform;
    applying an ambience transform for suppressing or mimicking aspects of ambience when the target audience is remote from a host setting; or
    applying a pace transform for simulating normal speech pitch or frequency characteristics during rapid playback of recorded communications when the target audience is associated with missing presence during the communication session.

18. A computer implemented system that preprocesses audio streams with an ambience transform in order to enrich multiparty communication environments, comprising:
    a connection component that hosts a multiparty communication session in which at least one party is a remote party;
    an interface component that maintains a public channel that propagates public communication to substantially all connected parties; and that further maintains a private channel that propagates private communication to a selected subset of all connected parties; and
    an audio transformation component that applies an ambience transform, based at least in part on a relative geography between a target audience and a host environment or a communication source, to an audio portion of the private communication, the ambience transform employing speech or audio processing techniques to at least one of (1) insert, substitute, or interpolate target ambient acoustic features; (2) insert, substitute, or interpolate host environment ambient acoustic features; or (3) dampen, modify, or remove source ambient acoustic features.

* * * * *